US012345409B2

(12) United States Patent
Mo

(10) Patent No.: US 12,345,409 B2
(45) Date of Patent: Jul. 1, 2025

(54) LIGHT-MIXING COVER WITH DIFFERENT LENSES, AND LIGHTING DEVICE

(71) Applicant: Aputure Imaging Industries Co., Ltd., Guangdong (CN)

(72) Inventor: Huaiyou Mo, Guangdong (CN)

(73) Assignee: Aputure Imaging Industries Co., Ltd., Shenzhen (CN)

(*) Notice: Subject to any disclaimer, the term of this patent is extended or adjusted under 35 U.S.C. 154(b) by 0 days.

(21) Appl. No.: 18/400,448

(22) Filed: Dec. 29, 2023

(65) Prior Publication Data

US 2024/0328596 A1 Oct. 3, 2024

(30) Foreign Application Priority Data

Mar. 30, 2023 (CN) ........................ 202320723594.3

(51) Int. Cl.

| | |
|---|---|
| ***F21V 5/00*** | (2018.01) |
| ***F21V 9/08*** | (2018.01) |
| *F21Y 113/00* | (2016.01) |
| *F21Y 115/10* | (2016.01) |

(52) U.S. Cl.

CPC ................ *F21V 9/08* (2013.01); *F21V 5/007* (2013.01); *F21Y 2113/00* (2013.01); *F21Y 2115/10* (2016.08)

(58) Field of Classification Search

CPC ........ F21V 5/007; F21V 9/08; F21Y 2105/10; F21Y 2105/12; F21Y 2105/16; F21Y 2105/18

See application file for complete search history.

(56) References Cited

U.S. PATENT DOCUMENTS

| | | | | |
|---|---|---|---|---|
| 4,254,453 A * | 3/1981 | Mouyard | G09F 13/22 | 345/82 |
| 6,554,451 B1 * | 4/2003 | Keuper | F21V 5/007 | 362/244 |
| 6,940,660 B2 * | 9/2005 | Blumel | F21V 5/007 | 359/728 |
| 7,950,832 B2 * | 5/2011 | Tanaka | F21V 5/007 | 362/803 |
| 9,739,462 B2 * | 8/2017 | Georgitsis | F21V 5/007 | |
| 10,795,154 B2 * | 10/2020 | Adeyshvili | G02B 27/0172 | |
| 11,333,328 B1 * | 5/2022 | Yang | F21V 5/007 | |
| 11,366,261 B2 * | 6/2022 | Okahisa | F21V 5/007 | |
| 11,396,983 B2 * | 7/2022 | Qiao | F21V 5/007 | |
| 2008/0043466 A1 * | 2/2008 | Chakmakjian | F21V 5/007 | 362/237 |
| 2013/0141908 A1 * | 6/2013 | Rodriguez | F21V 5/007 | 362/240 |
| 2023/0184405 A1 * | 6/2023 | Zhu | F21V 5/007 | 362/145 |
| 2024/0255116 A1 * | 8/2024 | Spink | F21V 5/007 | |

* cited by examiner

*Primary Examiner* — Ismael Negron

(74) *Attorney, Agent, or Firm* — PV IP PC; Wei Te Chung

(57) ABSTRACT

A light-mixing cover includes a base plate and multiple lens groups. The base plate has a lens plane, and the multiple lens groups are arranged on the lens plane in a first direction. Each of the lens groups includes multiple lenses arranged at intervals in a second direction perpendicular to the first direction. At least one of the lenses is different in structure from an adjacent lens. A lighting device might include a housing, a lamp board with a plurality of lamp beads forming groups, and the light-mixing cover. At least one of the lamp beads is different in structure from an adjacent lamp bead.

18 Claims, 5 Drawing Sheets

LIGHT-MIXING COVER WITH DIFFERENT LENSES, AND LIGHTING DEVICE

CROSS-REFERENCE TO RELATED APPLICATION

This application claims priority to Chinese Application No. 202320723594.3, filed on Mar. 30, 2023. The disclosure of the above application is incorporated herein by reference in its entirety.

FIELD

The present disclosure relates to optoelectronics technologies, and more particularly, to a light-mixing cover and a lighting device.

BACKGROUND

A lamp board of a lighting device is generally formed by arranging multiple light-emitting diode (LED) small-particle lamp beads in an array, and a surface light source is formed by arranging multiple point light sources that emit light in an array. If light-concentrating or light-mixing is required, a light-concentrating system is required for each LED light source. A plate lens is formed by light-concentrating systems arranged in an array.

In general, multiple lenses forming a plate lens are identical. When the lamp board is formed by lamp beads of same color temperature and color, each lens on the plate lens has a same effect on each lamp bead, and a lighting area of the lighting device has no distinct light area and dark area. When the lamp board is formed by lamp beads of multiple color temperatures or multiple colors, since the lenses on the plate lenses are of a single type, the lenses have different effects on lamp beads of different colors. Thus, mixed light is uneven or brightness is not inconsistent, boundary area, bright-dark area which are distinct appear in the lighting area of the lighting device, and the lighting effect is affected.

SUMMARY

A light-mixing cover according to one or more embodiments of the present disclosure includes a base plate and multiple lens groups, the base plate having a lens plane, the multiple lens groups being arranged on the lens plane in a first direction, at least one of the lens groups including multiple lenses, the multiple lenses being spaced in a second direction, at least one of the lenses being different in structure from an adjacent lens, the first direction being perpendicular to the second direction, each of the lenses having an incident surface and an exit surface, the incident surface being disposed opposite to the exit surface, the incident surface being configured to receive and direct light to be refracted, and the exit surface being configured to receive and direct out refracted light.

A lighting device according to one or more embodiments of the present disclosure includes a housing having an open end and an installation cavity connected to the open end; a lamp board installed in the installation cavity through the open end; and a light-mixing cover connected to the lamp board to cover the open end. The lamp board is provided with multiple light source groups, each of the light source groups being disposed opposite to one of the lens groups, at least one of the light source groups includes multiple lamp beads, at least one of the lamp beads is different from adjacent lamp beads in structure.

LIST OF REFERENCE SIGNS

Figure 1:
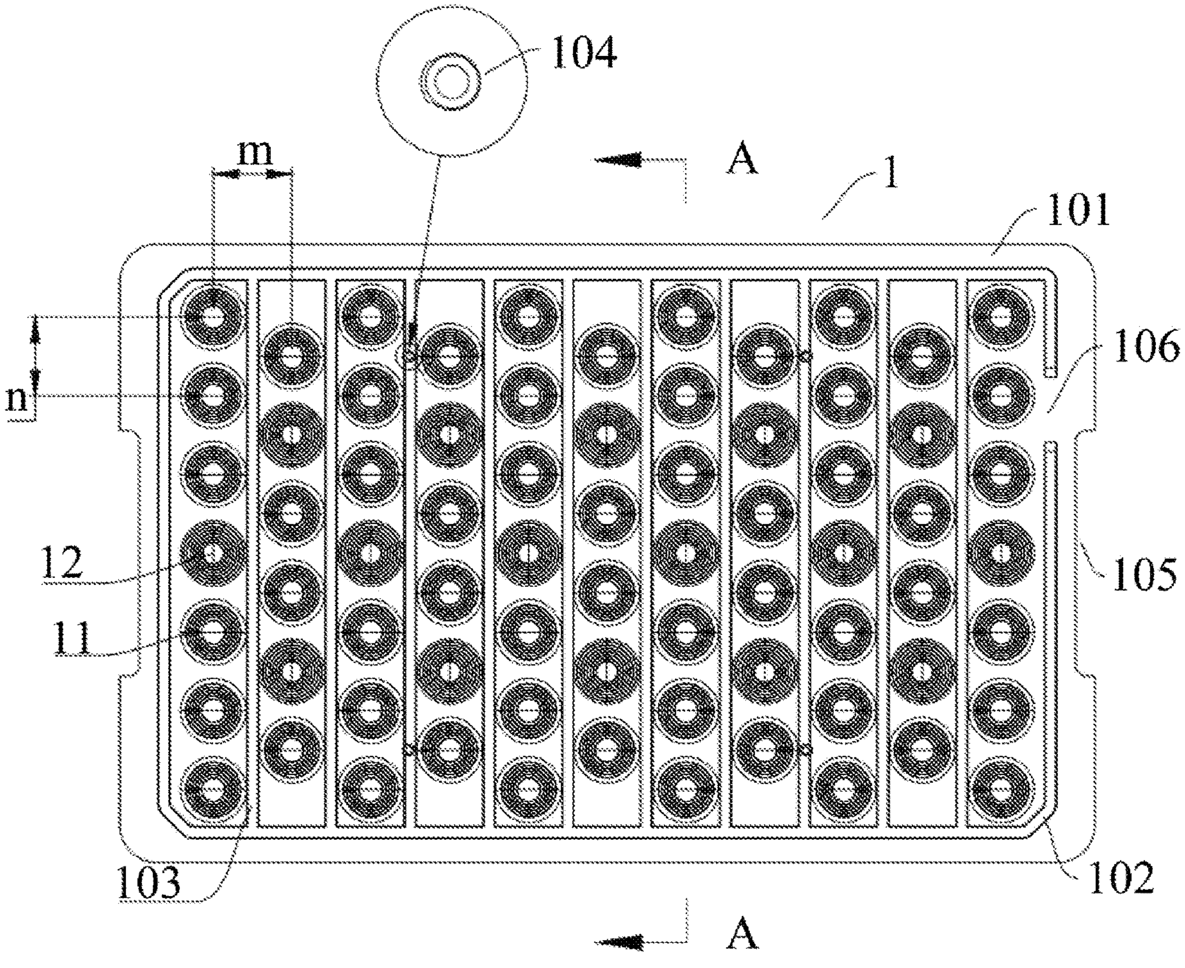
FIG. 1 is a schematic structural diagram of a light-mixing cover according to one or more embodiments of the present disclosure.

1. light-mixing cover; 11. first lens; 111. first incident surface; 112. first convex portion; 113. first tooth ring; 114. first exit surface; 12. second lens; 121. second incident surface; 122. second convex portion; 123. second tooth ring; 124. second exit surface; 13. bead surface; 101. lens plane; 102. protruding edge; 103. protruding rib; 104. fixing column; 105. avoidance area; 2. lamp board; 201. light source base plate; 21. first lamp bead; 22. second lamp bead; 23. fixing hole; 24. mounting hole; and 3. housing.

DETAILED DESCRIPTION

Some embodiments of the present disclosure will be described below in detail with reference to the accompanying drawings.

In the description of the present disclosure, it is to be noted that an directional or positional relationship indicated by terms “up”, “down”, “front”, “back”, “left”, “right”, “vertical”, “horizontal”, “top”, “bottom”, “in”, “out”, etc., is an orientation or position relationship shown in the drawings, merely for ease of description of the present disclosure and simplification of the description, and does not indicate or imply that the device or element referred to must have a particular orientation, be constructed and operated in a particular orientation. Therefore, it is not to be construed as limiting the present disclosure.

Unless defined otherwise, all technical and scientific terms used herein have the same meaning as commonly understood by those skilled in the art to which this disclosure belongs. The terms used in the description of the disclosure herein is for a purpose of describing specific embodiments only and is not intended to limit the disclosure.

Figure 2:
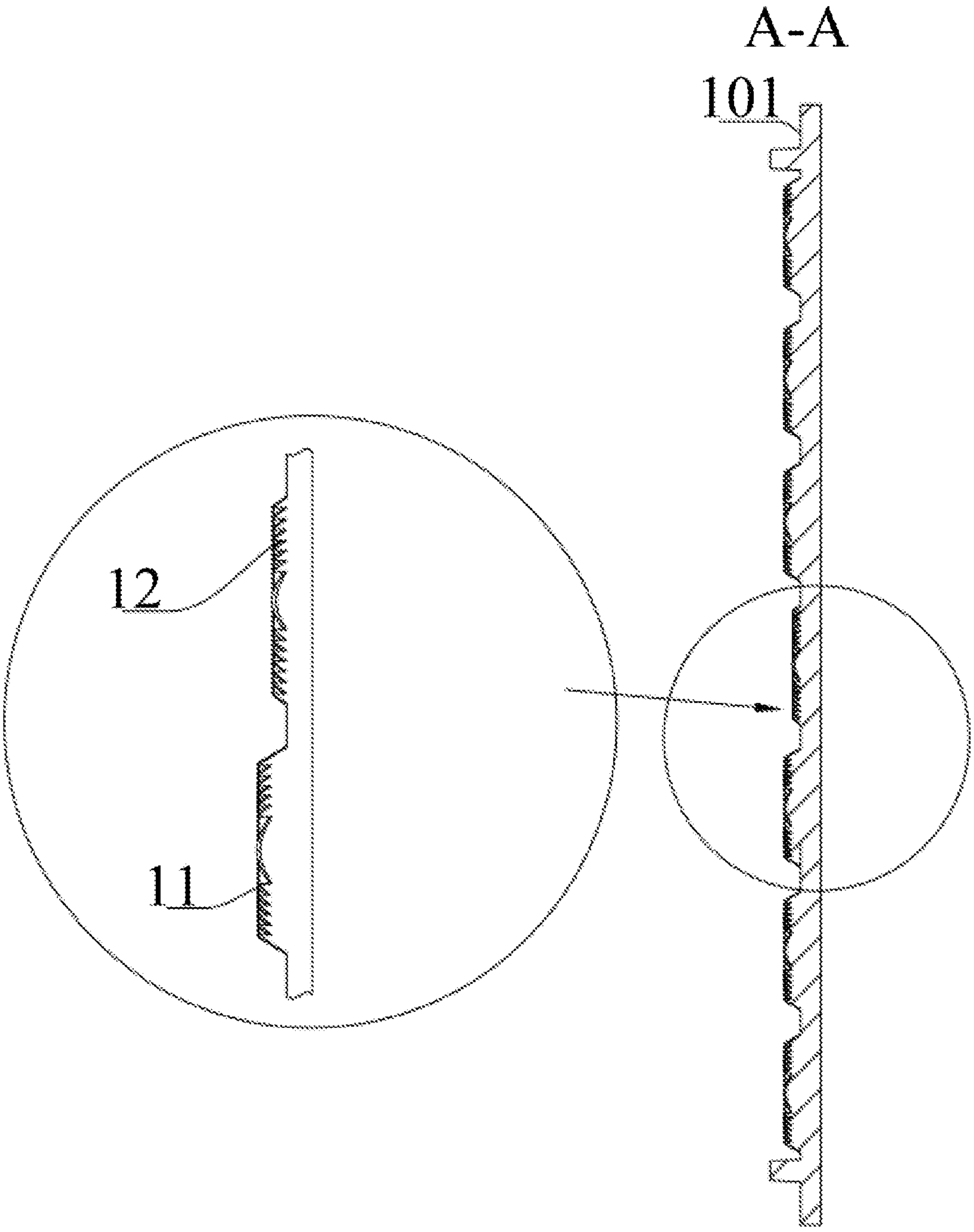
FIG. 2 is a cross-sectional view of the light-mixing cover along line A-A in FIG. 1.

A light-mixing cover 1 shown in FIGS. 1 and 2 includes a base plate having a lens plane 101, and multiple lens groups disposed on the lens plane 101 in a first direction to form an array of lens groups. One lens group includes multiple lenses spaced in a second direction to form an array of lenses. In the lens group, at least one lens and an adjacent lens are different in structure. The first direction is perpendicular to the second direction.

Figure 3:
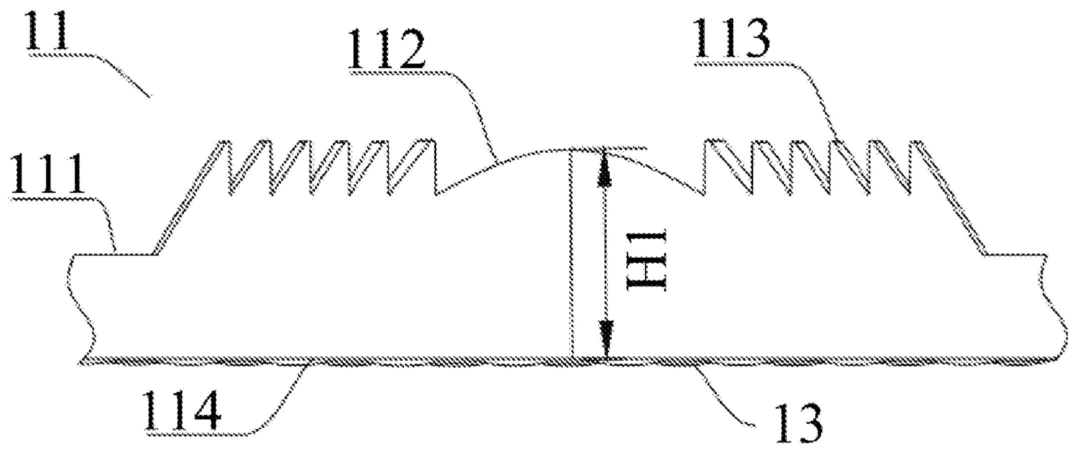
FIG. 3 is a cross-sectional view of a first lens according to one or more embodiments of the present disclosure.
Figure 4:
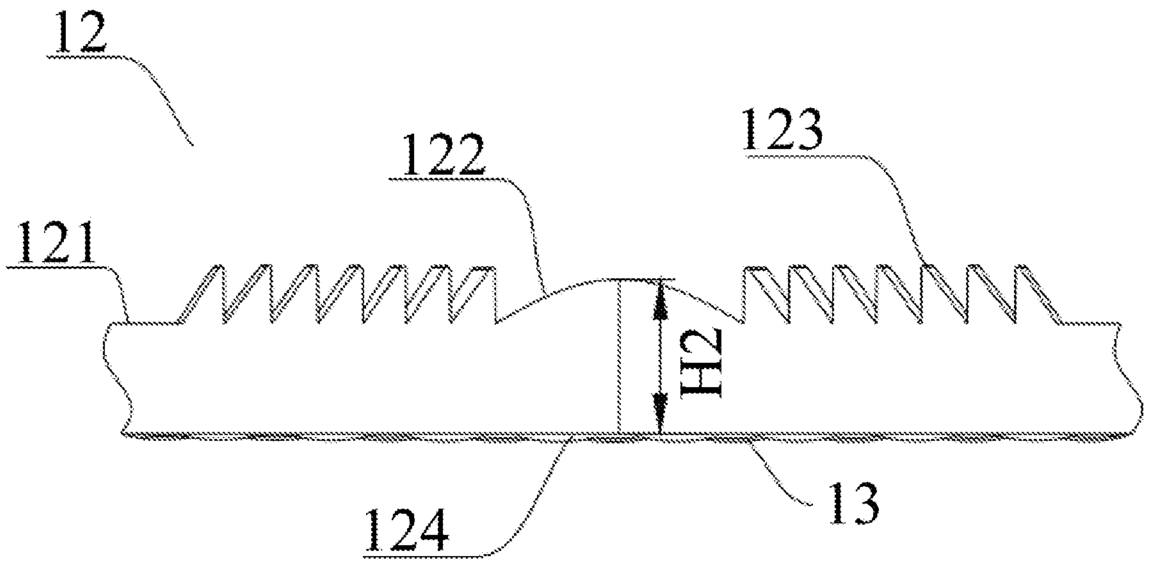
FIG. 4 is a cross-sectional view of a second lens according to one or more embodiments of the present disclosure.

Referring to FIGS. 3 and 4, the lens has an incident surface and an exit surface which are disposed on opposite sides of the lens. The incident surface is used to receive light and direct the light to be refracted, and the exit surface is used to receive refracted light and direct the refracted light out.

Note that the first direction may be a length direction of the lens plane 101, then the second direction is a width direction of the lens plane 101. Also, the first direction may be a width direction of the lens plane 101, then the corresponding second direction is a length direction of the lens plane 101. Also, the first direction may be a diagonal direction from left to right on the lens plane 101, then the corresponding second direction is a diagonal direction from right to left on the lens plane 101.

According to one or more embodiments of the present disclosure, regardless of lens groups and lens are arranged on the lens plane 101 in which manner as mentioned above, same effect can be achieved.

In the following, a first arrangement manner is explained as an example. The first direction is the length direction of the lens plane 101, and the second direction is the width direction of the lens plane 101.

Based on the above structure, when the light-mixing cover 1 according to one or more embodiments of the present disclosure is used, multiple different lenses are combined to form a lens group, and at least one lens and an adjacent lens are different in structure. Multiple lens groups are disposed on a base plate in the first direction, and lenses in the lens groups are disposed on the base plate in the second direction. Thus the multiple lenses can be arranged to form an array.

When the light-mixing cover 1 and the housing 3 are assembled, the incident surface of the lens on the light-mixing cover 1 may be disposed toward a lamp board in the housing 3, and the light-mixing cover 1 is connected to the housing 3. Each lens on the light-mixing cover 1 corresponds to one light source point on the lamp board. The incident surface of the lens receives the light emitted by the light source point and the light is refracted, so that light energy is concentrated and a light beam angle is reduced. After light-concentrating and light-mixing, the refracted light is received and directed out by the exit surface, thereby forming a lighted area with uniform brightness and no distinct boundary in the lighting area.

The lens according one or more embodiments is provided on the lens plane 101 of the base plate, and the lens and the base plate are integrally molded by injection molding. The base plate of the light-mixing cover 1 may be made of a transparent or translucent material, and may be made of a material having certain transmittance such as organic glass or transparent plastic, depending on the actual use.

It should be noted that, in a lens group, at least one lens and an adjacent lens are different in structure. The difference may be in size, specifically, different in diameter or thickness. Alternatively, during assembly, a mounting height of at least one lens with respect to the lens plane 101 is greater than a mounting height of an adjacent lens with respect to the lens plane 101.

When such a lens group is used in conjunction with a light source module, a lens having a large size may be provided opposite to a lamp bead having a large volume, so that light emitted by a lamp bead of a large volume can be incident more onto the lens, thereby improving utilization rate of light. A lens having a large height on the lens plane 101 may be provided opposite to a lamp bead having a small height on the lamp board, so that a distance from each lamp bead to an opposite lens is same, thereby achieving a same light-mixing effect.

Further, the lens group includes a first lens 11 and a second lens 12, the first lens 11 and the second lens 12 have different structures, and the first lens 11 and the second lens 12 in a same lens group are spaced on the lens plane 101 in the second direction.

Based on this structure, same or different number of first lenses 11 and second lenses 12 may be provided in a lens group, and the first lens 11 and the second lens 12 are different lenses. Specifically, the first lens 11 and the second lens 12 are different in lens size, and may be different in diameter or thickness. During assembly, mounting heights of the two kinds of lenses with respect to the lens plane 101 may also be different to accommodate different light source modules.

After multiple first lenses 11 and multiple second lenses 12 are spaced along the first direction and the second direction of the lens plane 101, a lens array arranged in an orderly manner and having a uniform structure is formed on the base plate. When used in conjunction with the lamp board, the lenses on the light-mixing cover 1 are uniformly arranged, so that the light emitted from the lamp board can be better received and refracted, thereby improving the utilization rate and intensity of light.

In one or more embodiments, both the first lens 11 and the second lens 12 are convex lenses. The first lens 11 has a first incident surface 111 on which a first convex portion 112 is provided, and the second lens 12 has a second incident surface 121 on which a second convex portion 122 is provided. Both the first convex portion 112 and the second convex portion 122 are configured to receive and direct the light to be refracted to form exit light which is concentrated and collimated.

A distance from a highest point on the first convex portion 112 to the lens plane 101 is H1, and a distance from a highest point on the second convex portion 122 to the lens plane 101 is H2, where H1 is greater than H2.

It should be noted that a surface of the convex portion on the incident surface is an arc surface. The arc surface has multiple points with different heights with respect to the lens plane 101, and a point on the arc surface with a farthest distance to the lens plane 101 is the highest point.

Based on this structure, when the lens group is assembled with the base plate, the first lens 11 and the second lens 12 are disposed at different heights with respect to the lens plane 101, respectively, and then arranged in an array to form a lens array having different heights. When the light-mixing cover 1 is assembled with the lamp board, since the lamp board has different lamp beads, and heights of the different lamp beads with respect to the light source base plate 201 are different, a first lens 11 having a large height on the light-mixing cover 1 is disposed opposite to a lamp bead having a relatively low height on the light source base plate 201, and a second lens 12 having a relatively small height on the light-mixing cover 1 is disposed opposite to a lamp bead having a relatively large height on the light source base plate 201.

In this way, the first lens 11 and the second lens 12 can be disposed respectively opposite to light source points of different specifications on the lamp board, so that a distance between each lens and an opposite light source points is same. In use, since the distance between each lens and the opposite lamp bead is same, paths of light emitted by different lamp beads after passing through the lens are substantially consistent, and the illuminance is uniform after passing through the lens, so that a concentrated and uniformly mixed lighting region is formed.

It should be noted that the first lens 11 and the second lens 12 disposed at different heights respectively with respect to the lens plane 101 may be provided in the following ways:

First, two lenses having different thicknesses respectively are used, and an overall thickness of the first lens 11 is greater than that of the second lens 12. When the first lens 11 and the second lens 12 are disposed on the base plate, a distance H1 between a highest point of a first lens 11 having a greater thickness and the lens plane 101 is greater than the distance H2 between the highest point of the second lens 12 and the lens plane 101.

Second, a first mounting portion and a second mounting portion having different heights respectively are provided on the lens plane 101. A height of the first mounting portion relative to the lens plane 101 is greater than a height of the second mounting portion relative to the lens plane 101. The first lens 11 is provided on the first mounting portion, and the second lens 12 is provided on the second mounting portion. Thus, the distance between the highest point of the first lens 11 and the lens plane 101 is greater than the distance between the highest point of the second lens 12 and the lens plane 101, so that the two types of lenses can be used in conjunction with different lamp beads on the lamp board.

In one or more embodiments, both the first lens 11 and the second lens 12 are Fresnel lenses, the first lens 11 has a first incident surface 111, a first convex portion 112 is provided in a middle portion of the first incident surface 111, multiple concentric first tooth rings 113 are provided on the first incident surface 111 convexly, and the multiple first tooth rings 113 are provided around an outer periphery of the first convex portion 112.

Similarly, the second lens 12 has a second incident surface 121, a second convex portion 122 is provided in a middle portion of the second incident surface 121, multiple concentric first tooth rings 123 are provided on the second incident surface 121 convexly, and the multiple second tooth rings 123 are provided around an outer periphery of the second convex portion 122.

Based on this structure, when the lens group is assembled with the base plate, the first lens 11 and the second lens 12 are respectively disposed at different heights with respect to the lens plane 101 to form a lens array having different heights. When the light-mixing cover 1 is assembled with the lamp board, since the lamp board has different lamp beads, and heights of the different lamp beads with respect to the light source base plate 201 are different, a first lens 11 having a large height on the light-mixing cover 1 is disposed opposite to a lamp bead having a relatively low height on the light source base plate 201, and a second lens 12 having a relatively small height on the light-mixing cover 1 is disposed opposite to a lamp bead having a relatively large height on the light source base plate 201.

In this way, the first lens 11 and the second lens 12 can be disposed respectively opposite to light source points of different specifications on the lamp board, so that a distance between each lens and an opposite light source points is same. In use, since the distance between each lens and the opposite lamp bead is same, paths of light emitted by different lamp beads after passing through the lens are substantially consistent, and the illuminance is uniform after passing through the lens, so that a concentrated and uniformly mixed lighting region is formed.

It should be noted that, conventionally, a Fresnel lens may be formed by removing as many optical materials as possible while curvature of a surface of a convex lens is retained, so that multiple groove portions are formed on the surface of the Fresnel lens, thereby achieving a same concentrating effect while reducing weight.

Referring to FIGS. 3 and 4, a convex portion in middle of the incident surface of the first lens 11 or the second lens 12 is a convex lens, and multiple tooth rings around the convex portion are provided on the incident surface. Each of the tooth rings has a vertical wall perpendicular to the lens plane 101 and an inclined wall provided at an included angle to the lens plane 101, and the vertical wall intersects the inclined wall.

Depending on an incident angle of light, part of the light emitted from the lamp beads is incident on the convex portion in the middle of the incident surface, exit light is formed after refraction at the convex-transparent portion and is directed out of the incident surface. An exit light beam angle is less than an incident light beam angle, and the light is concentrated and mixed.

Also, part of the light emitted by the beads is incident on the tooth ring outside the convex portion. Since the tooth ring is in a tooth shape, and is formed by intersection of a vertical wall and an inclined wall. The light is concentrated on the tooth ring as follows: Part of the light is incident on the inclined wall of the tooth ring. The part of the light is first refracted on the inclined wall to form concentrated light which is then directed out by the exit surface.

Also, part of the light is incident on the vertical wall of the tooth ring, and the part of the light has light having a large incident angle and light having a small incident angle. When incident on the vertical wall, the light having a small incident angle is directly refracted on the vertical wall to form concentrated light which is then directed out by the exit surface;

When incident onto the vertical wall, the light having a large incident angle is totally reflected on the vertical wall to be incident on the inclined wall, and refracted on the inclined wall to form a light beam having a small incident angle. Concentrated light is directed out by the exit surface.

In addition, height of a tooth ring close to an edge of the lens with respect to the lens plane 101 and height of a tooth ring close to a center of the lens with respect to the lens plane 101 are same, so that concentrating and mixing effects on light are same.

It should be noted that the number of the first tooth rings 113 and the number of the second tooth rings 123 may be same or different. The distance between each of the lenses and the opposite lamp bead is same, while different lamp beads have different volumes and different corresponding light-emitting angles. Thus, in order to match volumes of the lens and the lamp bead, an overall size of the second lens 12 may be set greater than an overall size of the first lens 11.

A lens having a greater overall size also corresponds to a greater weight, so that the number of the second tooth rings 123 may be set greater than the number of the first tooth rings 113. A greater number of second tooth rings 123 are provided on the outer periphery of the second convex portion 122, so that weight of the second lens 12 can be further reduced and concentrating effect of the second lens 12 can be enhanced. Each tooth ring is equivalent to an independent lenslet, so that light can be adjusted to be converged, thereby improving the utilization rate of the light.

In this way, during assembly, the second lens 12 may be provided opposite to a lamp bead having a greater volume on the lamp board. The number of the second tooth rings 123 is greater, and the overall size of the second lens 12 is greater. Thus, the second lens 12 can receive more light, the amount of light having a greater angle emitted by the lamp bead which is incident out of the lens is reduced, the utilization rate of the light is improved, and the light is concentrated and mixed uniformly, thereby obtaining a lighting area with uniform brightness.

The light-mixing cover 1 according to one or more embodiments is formed by arranging multiple Fresnel lens arrays having different structures. The light-mixing cover 1 is thin in thickness and light in weight as a whole to achieve the effects of light concentration and uniform light-mixing, and is easy to process to effectively reduce costs.

Further, referring to FIG. 1, two adjacent lenses in the first direction are staggered, and a center distance between the two lenses is m. A center distance between two adjacent lenses in the second direction is n. A ratio of n to m is 1.

It should be noted that the center distance of the two lenses described herein includes a linear distance from a center of a lens to a center of an adjacent lens.

Based on this structure, two adjacent lenses in the first direction are staggered so that projections of the two lenses in the first direction overlap. When the lenses are spaced in the first direction, a center distance between two adjacent lenses is set to m. When the lenses are spaced in the second direction, a center distance between two adjacent lenses in a same lens group is set to n. A ratio of n to m is 1.

In a lens array thus formed, although the first lens 11 and the second lens 12 are different in structure, the center distance between two adjacent lenses in the first direction is same as the center distance between two adjacent lenses in the second direction, that is, distances between any one lens and various adjacent lenses respectively are same. The lens array thus formed is stable in structure and uniform in arrangement.

In addition, since two adjacent lenses in the first direction are staggered, the lens array can mix light of different colors or different color temperatures in a staggered manner when receiving the light from the lamp board, so that the light can be further scattered, and the light-mixing effect is better.

If the ratio of n to m is less than 1, a spacing distance between two adjacent lenses in the first direction is greater than a spacing distance between two adjacent lenses in the second direction. In use, since the spacing distance between lenses in the second direction is small, area of light falling on a spacing between lenses is small, and the lens can receive more light.

However, since the distance between the lenses in the first direction is large, area of light falling on a spacing between lens is large, and the light that can be received by the lens become less. In this direction, part of the light passing through the lens and part of the light passing through the spacing between lenses are presented as bright and dark on the lighting area. In addition, the light passes through the light-mixing cover 1 and falls on the lighting area, and the brightness presented in two perpendicular directions may also be inconsistent.

When the ratio of n to m is greater than 1, the above-mentioned consequences may also occur, which is not described too much herein. Therefore, the lenses are equidistantly arranged in both the first direction and the second direction, so that the light-mixing effect of the light-mixing cover 1 can be enhanced.

Further, the first lens 11 has a first exit surface 114, and the first incident surface 111 and the first exit surface 114 are sequentially arranged in a direction of light incidence. The second lens 12 has a second exit surface 124, and the second incident surface 121 and the second exit surface 124 are sequentially arranged in the direction of light incidence.

Both the first exit surface 114 and the second exit surface 124 are configured to receive and direct out light refracted by the first incident surface 111 and the second incident surface 112, and are provided with multiple bead surfaces 13. The bead surfaces 13 are convex in a direction away from the first exit surface 114 and the second exit surface 124, and are configured to increase haze of the first exit surface 114 and the second exit surface 124 so that the light is further uniformly mixed.

Based on this structure, the incident surface and the exit surface are provided on two sides of the lens. When the light-mixing cover 1 is assembled with the lamp board, the incident surface is provided toward a light-emitting surface of the lamp board, and the exit surface is provided opposite to the light-emitting surface of the lamp board. Continuous bead surfaces 13 are provided on the exit surface, and the bead surface 13 is convex with respect to the exit surface, so that the exit surface has an uneven structure.

In this way, when the light is incident on the lens, the light is received and is directed to be refracted by the incident surface. Since angles of the light incident on the incident surface are different, angles of refracted light are different, and the light can be scattered to be mixed. The refracted light is received and directed out by the exit surface. When directed out, a direct angle of light is changed by passing through the bead surface 13, and the light is further diffused uniformly, thereby further improving the light-mixing effect. The bead surface 13 is capable of increasing the haze of the exit surface, effectively preventing stray light from being directly toward the human eye, and preventing glare from causing visual fatigue.

In addition, the exit surface of the lens may be sanded to form a honeycomb concave-convex structure, so that the haze of the exit surface is increased, and direct light is diffusely reflected on a sanded structure, thus further uniformly mixing the light. In this way, the transmittance is ensured, and eye discomfort caused by glare generated when the user looks directly at the light is prevented.

It should be noted that the incident surface of the lens may be provided with a texture or a sanded process. When the light source is a multi-color light source, the uniform effect of light-mixing may be further improved.

Further, the lens plane 101 is circumferentially provided with and surrounded by a protruding edge 102, a placement space is defined by the protruding edge 102, multiple lens groups are installed in the placement space, multiple protruding ribs 103 are evenly spaced in the placement space, the multiple protruding ribs 103 are distributed in the first direction, and an installation compartment is defined between two adjacent protruding ribs 103, and each installation compartment is provided with a lens group. The protruding edge 102 is configured to connect to a housing 3, and the protruding rib 103 is used for increasing strength of the base plate and isolating light of two adjacent lens groups.

Based on this structure, when the light-mixing cover 1 is assembled with the housing 3, a side of the light-mixing cover 1 provided with a protruding edge 102 is provided toward the housing 3, and the housing 3 has an open end. A circumferential groove may be provided around the edge of the open end, so that the protruding edge 102 is clamped with the groove correspondingly, thereby connecting the light-mixing cover 1 and the housing 3.

Multiple protruding ribs 103 are also provided in the placement space. The multiple protruding ribs 103 divide the placement space into multiple identical installation compartments. Width of each of the installation compartments is at least greater than an overall diameter of the second lens 12, so that the lens group can be completely accommodated. Each lens group is installed to an installation compartment respectively, and a linear distance between two adjacent lens groups is equal to a distance between two adjacent lenses within a same lens group, thereby forming a lens array.

The protruding rib 103 can increase strength of the light-mixing cover 1. In order to ensure the transmittance of the light-mixing cover 1, the light-mixing cover 1 is made light and thin, so as to improve the light intensity. However, since the thickness is relatively thin, the strength of the light-mixing cover 1 may be not enough. In a mounting process, there may be a case where the light-mixing cover 1 is damaged by pressing. The protruding rib 103 is provided on the base plate, so that the strength of the light-mixing cover 1 can be increased, and the light-mixing cover 1 is not easily damaged by force.

It should be noted that a distance between an end surface of the protruding rib 103 away from the lens plane 101 and the lens plane 101 is H3, which is greater than H1, so that the protruding rib 103 can better isolate two adjacent lens groups, where H1 is the distance between the highest point on the first lens 11 and the lens plane 101.

During use after assembling the light-mixing cover 1 with the lamp board, in the first direction, part of light emitted by the lamp beads is incident on a directly opposite lens, and part of the light is incident on an adjacent lens. Since a height of the protruding rib 103 with respect to the lens plane 101 is greater than a height of the lens group with respect to the lens plane 101, that is, the protruding rib 103 is higher than the height of any one of the lenses, when the protruding rib 103 is disposed between two adjacent lens groups, light can be blocked from a side of the lens group. Light of the lamp beads is prevented from being transmitted to an adjacent lens group to cause light to cross-talk with each other, thereby improving the light-concentrating and light-mixing effects of the light-mixing cover 1.

Further, multiple fixing columns 104 are provided on the protruding ribs 103 at intervals, and the fixing columns 104 are used for connecting to the lamp board. Two sides of the base plate are provided with an avoidance area 105 for providing avoidance space for a magnet member on the housing 3.

Based on this structure, when the light-mixing cover 1 is assembled with the lamp board in the housing 3, multiple fixing columns 104 are provided on the protruding ribs 103 of the light-mixing cover 1, and multiple fixing holes 23 are provided on the lamp board. There is a one-to-one correspondence between the fixing columns 104 and the fixing holes 23, so that a connection between the light-mixing cover 1 and the lamp board is realized, and pre-positioning before the light-mixing cover 1 is connected to the housing 3 is realized. The protruding edge 102 on the lens plane 101 of the light-mixing cover 1 is connected to periphery of the housing 3, for example, an adhesive is provided on the protruding edge 102, and the protruding edge 102 is adhered to the housing 3.

In this process, since a magnet member configured to connect to an external function member is provided on an end surface of the housing 3 facing the light-mixing cover 1 convexly, avoidance areas 105 on two sides of the light-mixing cover 1 can provide extension space for the magnet member, and the light-mixing cover 1 is connected to the end surface of the housing 3 after avoiding the magnet member.

When the light-mixing cover 1 is connected to the lamp board, there is a one-to-one correspondence with the lens of the light-mixing cover 1 and the lamp bead on the lamp board. Moreover, the height of the protruding rib 103 with respect to the lens plane 101 is greater than the height of the lens group with respect to the lens plane 101. The protruding rib 103 can prevent the lens and the lamp bead from squeezing each other during the connection between the light-mixing cover 1 and the lamp board.

Figure 5:
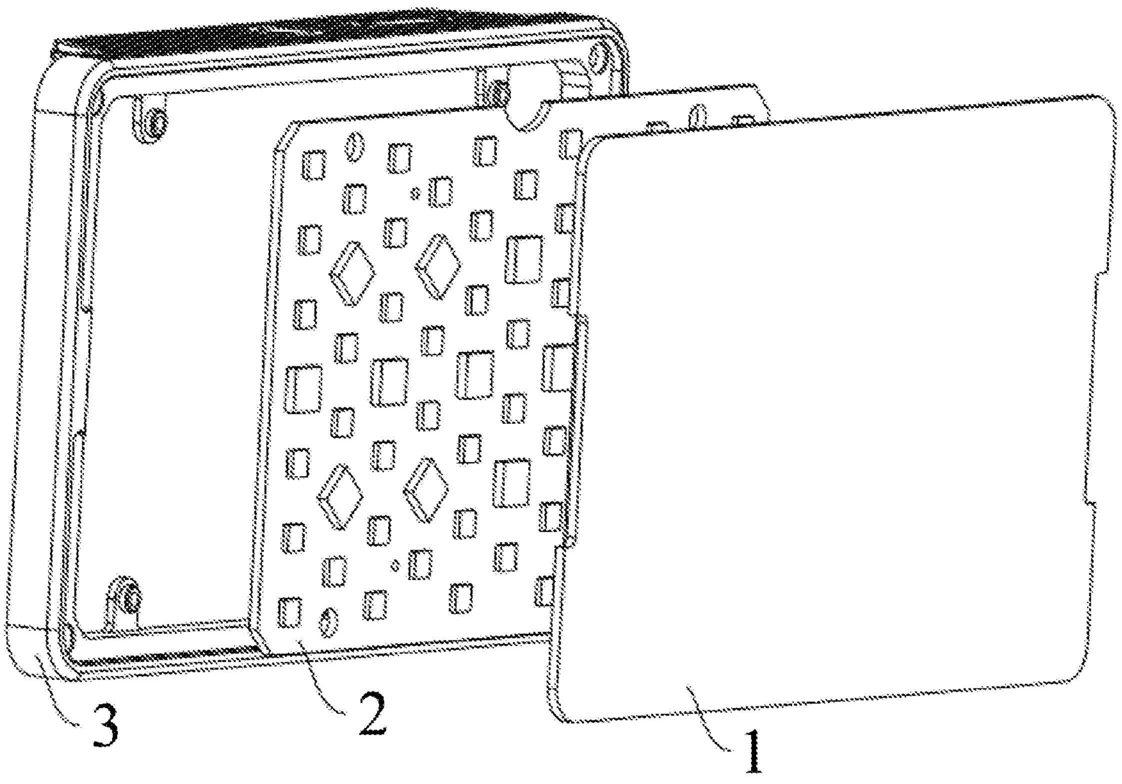
FIG. 5 is a schematic structural diagram of a lighting device according to one or more embodiments of the present disclosure.

Referring to FIG. 5, a lighting device according to one or more embodiments of the present disclosure includes the light-mixing cover 1 described above, a housing 3, and a lamp board 2. Specifically, the housing 3 includes an open end and an installation cavity connected to the installation cavity, the lamp board 2 is installed into the installation cavity through the open end, and the light-mixing cover 1 is connected to the lamp board 2 to cover the open end.

The lamp board 2 includes a light source base plate 201 provided with multiple light source groups. Each light source group corresponds to a lens group. The light source group includes multiple lamp beads, and at least one lamp bead is different from an adjacent lamp bead in structure.

During assembly, the lamp board 2 and the light-mixing cover 1 are installed in the housing 3 in sequence. Specifically, multiple mounting holes 24 may be provided on the light source base plate 201, and the light source base plate 201 is connected to an inner end wall of the housing 3 by a screw member. When the light-mixing cover 1 and the lamp board 2 are assembled, the incident surface of the lens group is disposed toward the light source group, a lens is disposed opposite to a lamp bead. The light source base plate 201 may be provided with multiple fixing holes 23, so that the light-mixing cover 1 is connected to the fixing holes 23 of the light source base plate 201 by the fixing columns 104 on the protruding ribs 103. Finally, the protruding edge 102 of the light-mixing cover 1 is glued to the periphery of the open end of the housing 3 so that the light-mixing cover 1 covers the open end.

In this way, when the light-mixing cover 1 and the lamp board 2 are provided correspondingly, each lens corresponds to one lamp bead. Light emitted by the lamp bead enters the lens, the angle of the light becomes smaller after refraction, the light is converged, and light of multiple colors is uniformly mixed in the refraction process. Thus, the lighting device can achieve a lighting region with uniform brightness and without distinct boundary.

There are at least two different structures of lamp beads on the light source base plate 201. The difference is in number of chips in the lamp beads, lighting angles of the lamp beads, etc.

Figure 6:
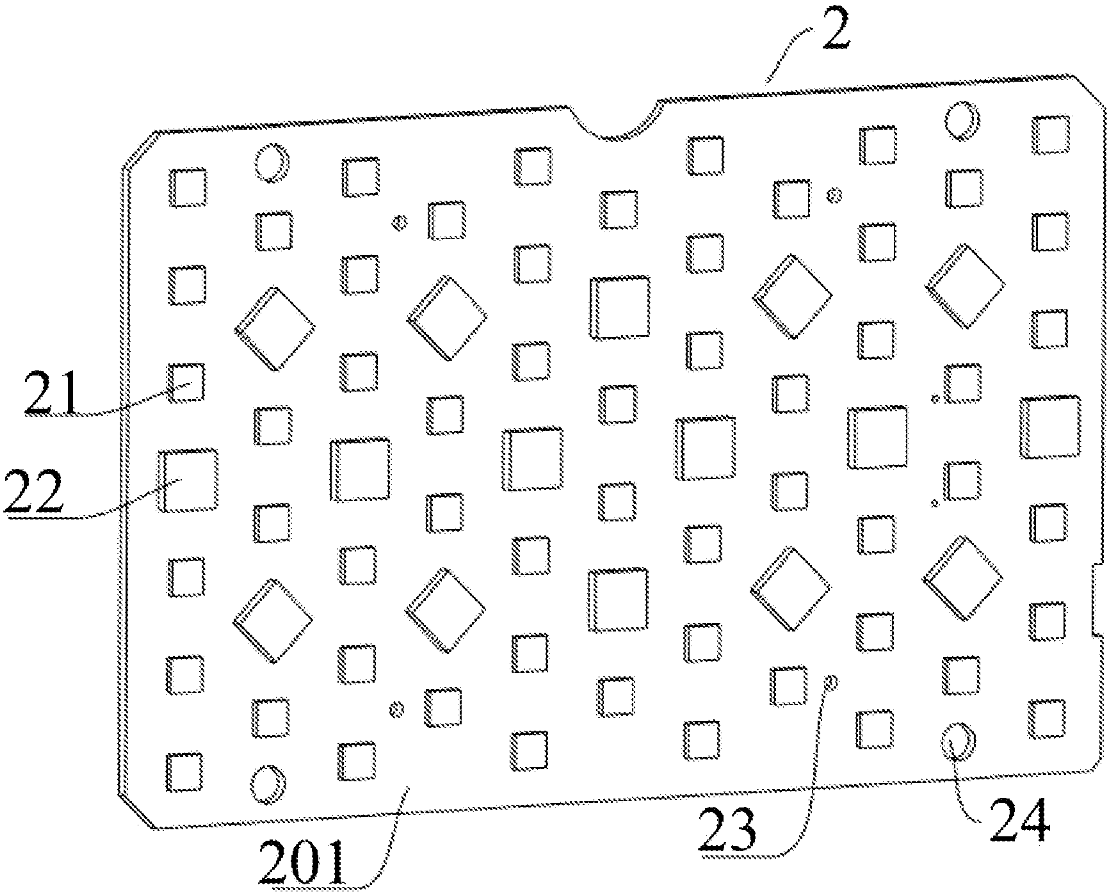
FIG. 6 is a schematic structural diagram of a lamp board according to one or more embodiments of the present disclosure.

Further, referring to FIG. 6, the light source group includes a first lamp bead 21 and a second lamp bead 22, and the first lamp bead 21 and the second lamp bead 22 are different in structure.

Based on this structure, when the light-mixing cover 1 is assembled with the light source group, the incident surface of the lens group is disposed toward the light source group. The first lamp bead 21 may be a single-chip bead, and the second lamp bead 22 may be a multi-chip bead, so that volume of such first lamp bead 21 is smaller than volume of the second lamp bead 22. The first lens 11 on the light-mixing cover 1 is provided opposite to the first lamp bead 21, and the second lens 12 is provided opposite to the second lamp bead 22.

Thus, since the first lens 11 is higher than the second lens 12 and the first lamp bead 21 is smaller than the second lamp bead 22 in volume, a distance between the first lamp bead 21 and the first lens 11 is consistent with a distance between the second lamp bead 22 and the second lens 12. In this way, paths of the light emitted by two kinds of beads to the lens 12 are consistent, and the light emitted by different beads are uniform when transmitted to the lighting area, so that non-uniform brightness does not occur.

When incident on the lens, the light is received and directed to be refracted by the incident surface. Since the angles of the light incident on the incident surface are different and the angles of the refracted light are different, the light can be scattered to be mixed. There is a bead surface 13 on the exit surface of the lens group. The bead surface 13 is convex in a direction away from the exit surface. The refracted light is received and directed out by the exit surface. When directed out, a direct angle of light is changed by passing through the bead surface 13, and the light is further diffused uniformly, thereby further improving the light-mixing effect. The bead surface 13 is capable of increasing the haze of the exit surface, and effectively preventing stray light from being directly toward the human eye.

Further, the first lamp bead 21 includes a white LED lamp bead and the second lamp bead 22 includes a red LED lamp bead and/or a green LED lamp bead and/or a blue LED lamp bead.

Based on this structure, the white LED lamp bead has a single chip. When the second lamp bead 22 is one of a red LED lamp bead or a green LED lamp bead or a blue LED lamp bead, the second lamp bead 22 also has a single chip. The first lamp bead 21 and the second lamp bead 22 have a same volume and different colors. When the beads are used in conjunction with the lenses, the lenses can refract light of different colors emitted by the beads to realize light concentration and uniform color mixing.

When chips of the second lamp bead 22 includes three types of chips: a red light chip, a green light chip, and a blue light chip, the second lamp bead 22 has a large volume. In this case, the first lamp bead 21 and the second lamp bead 22 have different volumes and different light-emitting angles. When the beads are used in conjunction with the lenses, the first lamp beads 21 are disposed opposite to the first lens 11 of a small size, and the second lamp beads 22 are disposed opposite to the second lens 12 of a large size.

The light emitted by the lamp beads are refracted and collimated when passing through the incident surface of the lens. Since the exit surface of the lens is the bead surface 13 or is provided with texture, when the light pass through the exit surface of the lens, the exit surface can refract and pull a circular spot of the lamp beads to form an elliptical spot, and further perform light-mixing and color-mixing.

It is an object of one or more embodiments of the present disclosure to provide a light-mixing cover, in which different lenses are provided on a base plate, so as to prevent the lens types on a plate lens from being single, and to prevent a distinct boundary area and a bright-dark area from appearing in a lighting area after the lens receives different light.

It is an object of the present disclosure to provide a lighting device in which a lens on a base plate of a light-mixing cover can prevent multiple kinds of lamp beads from emitting light, and prevent a distinct boundary area and a bright-dark area appearing in a lighting area.

One or more embodiments of the present disclosure have an advantage that the light-mixing cover is provided with lenses of different structures in an array, and there is a one-to-one correspondence between the lenses and the lamp beads of different specifications on the lamp board. In use, the light-mixing cover is capable of concentrating light emitted by the lamp beads, and is capable of uniformly mixing light of different colors or different color temperatures. A distance between each bead and an opposite lens is same, and the light can be further mixed uniformly.

Some embodiments of the present disclosure are described above, but the scope of the present disclosure is not limited thereto. Any modifications or equivalent substitutions that can readily occur to those skilled in the art based on the present disclosure are intended to fall within the scope of the present disclosure.

What is claimed is:

1. A light-mixing cover, comprising a base plate and a plurality of lens groups, wherein the base plate has a lens plane, and the plurality of lens groups are arranged on the lens plane in a first direction;

each of the lens groups comprises a plurality of lenses arranged at intervals in a second direction perpendicular to the first direction;

at least one of the lenses is different in structure from a lens of the lenses adjacent to the at least one of the lenses; and each of the lenses has an incident surface and an exit surface opposite to the incident surface, the incident surface is configured to receive and guide light to be refracted, and the exit surface is configured to receive and guide the refracted light to exit;

each of the lens groups comprises a first lens and a second lens, the first lens has a first incident surface on which a first convex portion is provided, and the second lens has a second incident surface on which a second convex portion is provided; a plurality of concentric first tooth rings are provided to protrude from the first incident surface and surround the first convex portion; and a plurality of concentric second tooth rings are provided to protrude from the second incident surface and surround the second convex portion;

wherein bottom ends of the plurality of first tooth rings along protruding directions thereof are protruded with respect to top ends of the plurality of second tooth rings along protruding directions thereof.

2. The light-mixing cover according to claim 1, wherein in the first direction every two adjacent lenses of the lens groups are staggered and have a first center distance;

in the second direction every two adjacent lenses of each of the lens groups have a second center distance; and a ratio of the second center distance to the first center distance is equal to 1.

3. The light-mixing cover according to claim 1, wherein the plurality of first tooth rings have same heights with respect to the lens plane, and the plurality of second tooth rings have same heights with respect to the lens plane.

4. The light-mixing cover according to claim 1, wherein a protruding edge is provided on the lens plane in a circumferential direction of the lens plane to surround a placement space;

a plurality of protruding ribs are provided at equal intervals in the placement space and arranged in the first direction; and a space between every two adjacent ones of the protruding ribs forms an installation compartment in which one of the lens groups is installed, and each of the protruding ribs is configured to increase a strength of the base plate and block light from each of two ones of the lens groups adjacent to the each of the protruding ribs.

5. The light-mixing cover according to claim 4, wherein a plurality of fixing columns are provided at intervals on at least one of the protruding ribs for connection with a lamp board; and the base plate is provided with avoidance areas respectively on opposite sides of the base plate to provide avoidance spaces for magnet members on a housing of a lighting device.

6. The light-mixing cover according to claim 1, wherein the first lens is different from the second lens in structure.

7. The light-mixing cover according to claim 6, wherein a first distance from a highest point of the first convex portion with respect to the lens plane to the lens plane is greater than a second distance from a highest point of the second convex portion with respect to the lens plane to the lens plane; and each of the first convex portion and the second convex portion is configured to condense incident light.

8. The light-mixing cover according to claim 7, wherein the first lens further has a first exit surface, and the first incident surface and the first exit surface are sequentially arranged in a direction of light incidence;

the second lens further has a second exit surface, and the second incident surface and the second exit surface are sequentially arranged in the direction of light incidence; and each of the first exit surface and the second exit surface is provided with a plurality of bead surfaces, and the bead surfaces protrude in a direction away from the first exit surface and the second exit surface and are configured to increase respective hazes of the first exit surface and the second exit surface.

9. A lighting device, comprising:

a housing having an open end and an installation cavity connected to the open end;

a lamp board installed in the installation cavity through the open end; and a light-mixing cover connected to the lamp board to cover the open end, wherein the light-mixing cover comprises a base plate and a plurality of lens groups;

the base plate has a lens plane, and the plurality of lens groups are arranged on the lens plane in a first direction;

each of the lens groups comprises a plurality of lenses arranged at intervals in a second direction perpendicular to the first direction;

at least one of the lenses is different in structure from a lens of the lenses adjacent to the at least one of the lenses;

each of the lenses has an incident surface and an exit surface opposite to the incident surface, the incident surface is configured to receive and guide light to be refracted, and the exit surface is configured to receive and guide the refracted light to exit;

the lamp board is provided with a plurality of light source groups respectively opposite to the plurality of lens groups; and each of the light source groups comprises a plurality of lamp beads, and at least one of the lamp beads is different in structure from a lamp bead of the lamp beads adjacent to the at least one of the lamp beads;

each of the lens groups comprises a first lens and a second lens, the first lens has a first incident surface on which a first convex portion is provided, and the second lens has a second incident surface on which a second convex portion is provided; a plurality of concentric first tooth rings are provided to protrude from the first incident surface and surround the first convex portion; and a plurality of concentric second tooth rings are provided to protrude from the second incident surface and surround the second convex portion;

wherein bottom ends of the plurality of first tooth rings along protruding directions thereof are protruded with respect to top ends of the plurality of second tooth rings along protruding directions thereof.

10. The lighting device according to claim 9, wherein in the first direction every two adjacent lenses of the lens groups are staggered and have a first center distance;

in the second direction every two adjacent lenses of each of the lens groups have a second center distance; and a ratio of the second center distance to the first center distance is equal to 1.

11. The lighting device according to claim 9, wherein the plurality of first tooth rings have same heights with respect to the lens plane, and the plurality of second tooth rings have same heights with respect to the lens plane.

12. The lighting device according to claim 9, wherein a protruding edge is provided on the lens plane in a circumferential direction of the lens plane to surround a placement space;

a plurality of protruding ribs are provided at equal intervals in the placement space and arranged in the first direction; and a space between every two adjacent ones of the protruding ribs forms an installation compartment in which one of the lens groups is installed, and each of the protruding ribs is configured to increase a strength of the base plate and block light from each of two ones of the lens groups adjacent to the each of the protruding ribs.

13. The lighting device according to claim 12, wherein a plurality of fixing columns are provided at intervals on at least one of the protruding ribs and are connected to the lamp board; and the base plate is provided with avoidance areas respectively on opposite sides of the base plate to provide avoidance spaces for magnet members on the housing.

14. The lighting device according to claim 9, wherein each of the light source groups comprises a first lamp bead and a second lamp bead, and the first lamp bead is different from the second lamp bead in structure.

15. The lighting device according to claim 14, wherein the first lamp bead comprises a white light-emitting diode (LED) lamp bead, and the second lamp bead comprises at least one of a red LED lamp bead, a green LED lamp bead or a blue LED lamp bead.

16. The lighting device according to claim 9, wherein the first lens is different from the second lens in structure.

17. The lighting device according to claim 16, wherein a first distance from a highest point of the first convex portion with respect to the lens plane to the lens plane is greater than a second distance from a highest point of the second convex portion with respect to the lens plane to the lens plane; and each of the first convex portion and the second convex portion is configured to condense incident light.

18. The lighting device according to claim 17, wherein the first lens further has a first exit surface, and the first incident surface and the first exit surface are sequentially arranged in a direction of light incidence;

the second lens further has a second exit surface, and the second incident surface and the second exit surface are sequentially arranged in the direction of light incidence; and each of the first exit surface and the second exit surface is provided with a plurality of bead surfaces, and the bead surfaces protrude in a direction away from the first exit surface and the second exit surface and are configured to increase respective hazes of the first exit surface and the second exit surface.

* * * * *